Dec. 23, 1958  J. A. HAMM  2,865,040
HEATED WINDSHIELD WIPER BLADE
Filed Nov. 1, 1957  2 Sheets-Sheet 1
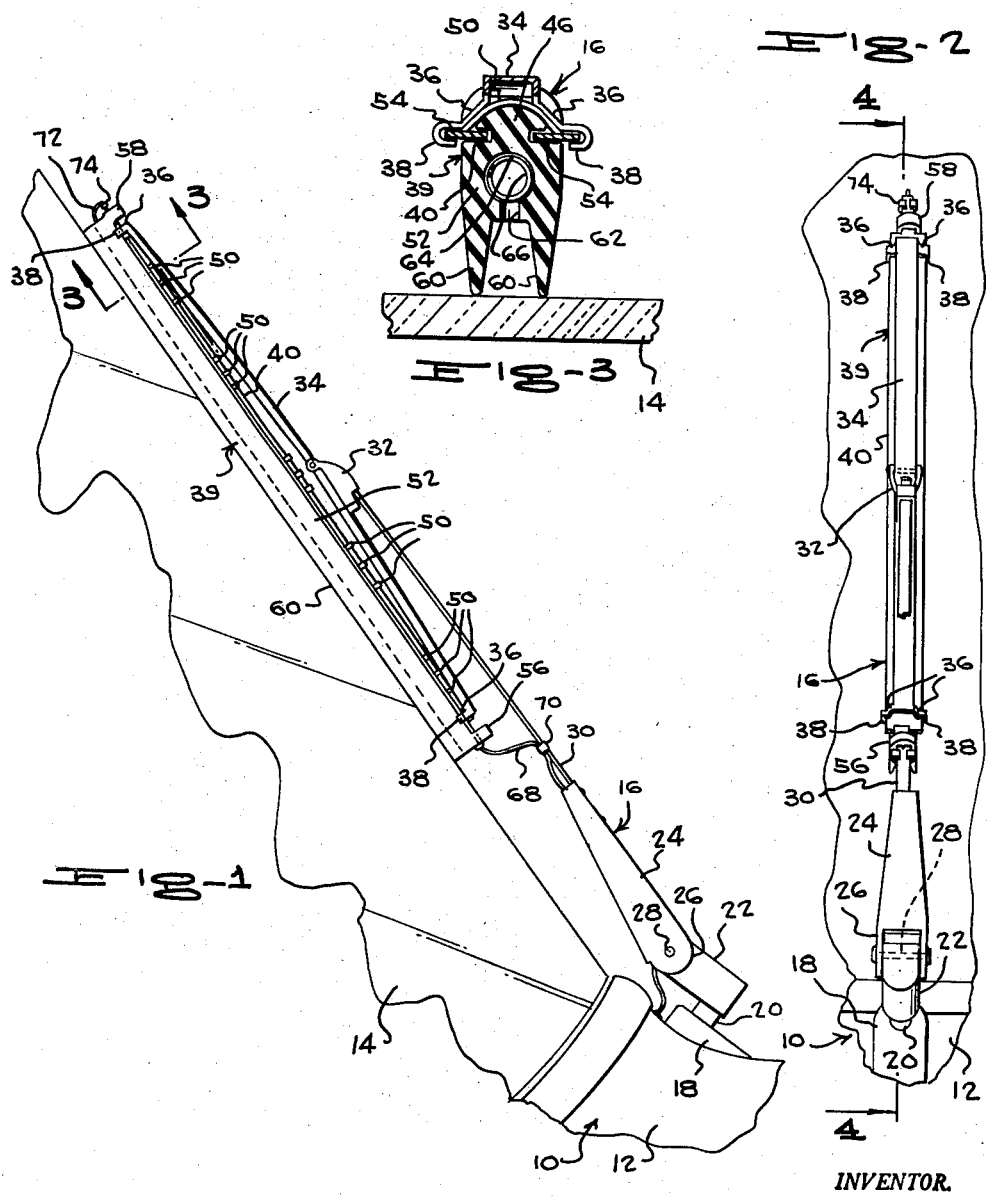
INVENTOR.
JAMES A. HAMM
BY
McMorrow, Berman & Davidson
ATTORNEYS

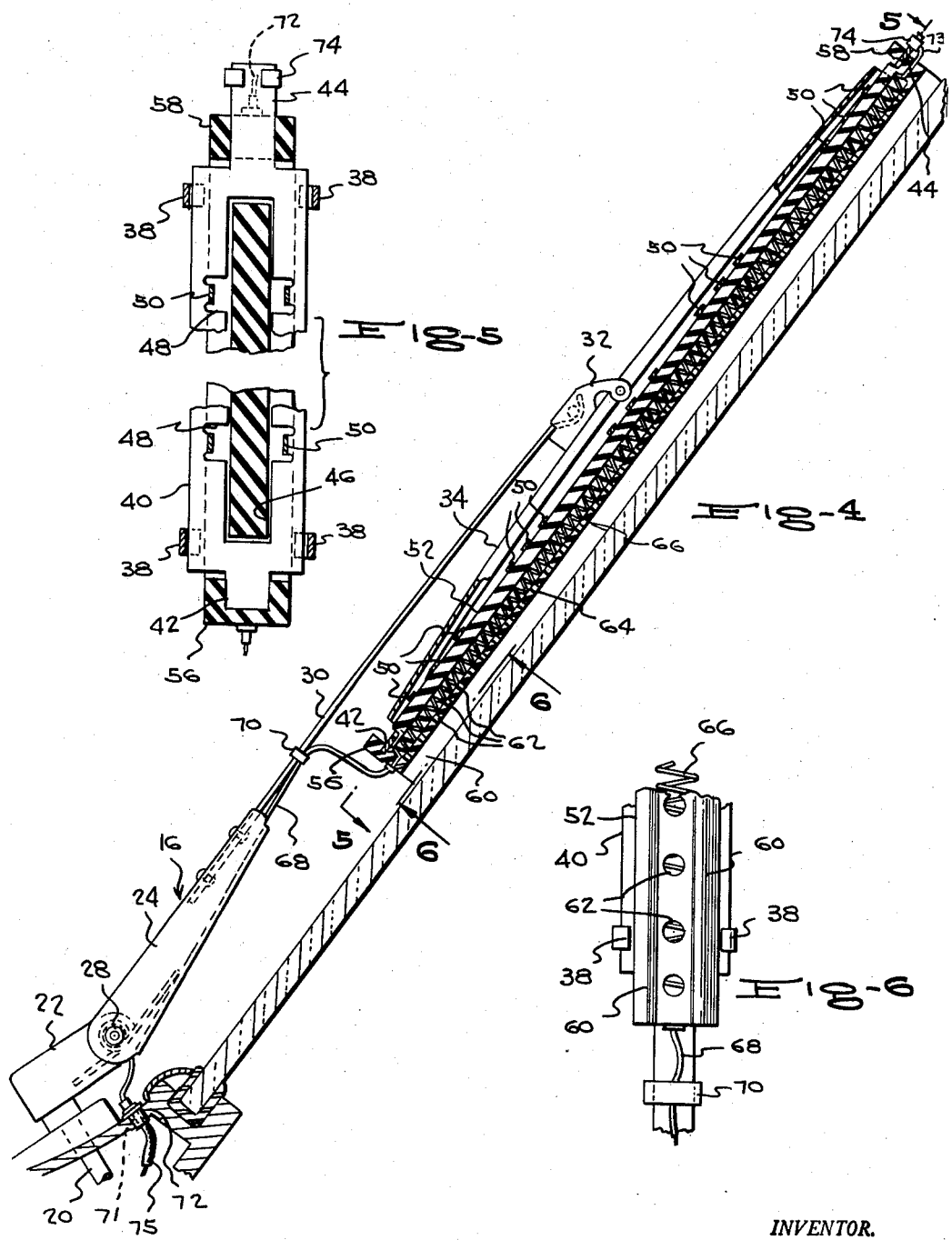

United States Patent Office 2,865,040
Patented Dec. 23, 1958

2,865,040

HEATED WINDSHIELD WIPER BLADE

James A. Hamm, Bethlehem, Pa., assignor of one-half to Catherine D. Hamm, Bethlehem, Pa.

Application November 1, 1957, Serial No. 693,955

2 Claims. (Cl. 15—250.5)

This invention relates to the manufacture of windshield wiper blades of the type used on present day automobile vehicles. More particularly, the invention has reference to an improved, heated blade, designed to be used in windshield wiper assemblies with minimum modification or redesign of the blade-supporting components, oscillating means, etc.

The desirability of a heated windshield wiper blade may be readily noticed when it is considered that particularly in winter months, heavy frosting of a windshield occurs, in a manner to reduce considerably the vision of the vehicle operator, thereby creating driving hazards which in many instances have resulted in serious accidents. Further, ice often forms upon a windshield, and snow may lodge thereon, again reducing visibility to a marked, highly unsafe extent.

It has been heretofore proposed that windshield wiper blades be heated, so as to eliminate the hazards noted above. However, so far as is known, the heating means heretofore conceived have not found commercial favor, and the main object of the present invention is to provide an improved heated windshield wiper blade which will be particularly designed to be adapted for commercial, large scale production. To this end, it is proposed to provide a blade which will make maximum use of the electrical energy required for heating the same, that is, there will be a far more efficient heating of the blade, and of the area of the windshield traversed by the blade, in relation to the amount of electrical energy expended for heating the blade, than has been true of previous devices conceived for the same general purpose.

Another object is to provide means of the character described that will have a novel blade formation which will be designed both for efficient wiping of the windshield by causing two blade edges to traverse the windshield in closely following order, and for defining between said blade edges a heat channel in which the heat will be concentrated for maximum effect upon the windshield surface.

Still another object is to provide a windshield wiper blade as stated which will be wholly flexible, so as to be conformed to the continually changing contours of the windshield area traversed thereby. This is especially important in view of modern automobile construction in which the windshields are invariably curved, and in many instances, are so curved as to cause the curvature to be on continuously changing radii over the area traversed by the windshield wiper blade.

Another object is to form the blade in such a manner as to achieve the desirable results referred to above, while still adapting the blade for engagement with conventional blade support mechanisms heretofore placed in use, whereby to permit the blade to be readily substituted for blades not having the features of the present invention, with minimum modification and redesign of the blade support mechanisms.

Another object is to provide a windshield wiper blade that will be automatically engageable with a source of electrical energy responsive to mounting of the blade in proper position upon the windshield wiper support arm, and responsive to no more than plugging in of a lead extending from the electrical resistance element embedded in the wiper blade.

Other objects will appear from the following description, the claims appended thereto, and from the annexed drawings, in which like reference characters designate like parts throughout the several views, and wherein:

Figure 1 is a side elevational view of a windshield wiper, illustrating the same in operative relationship to an automobile windshield only a fragment of which is shown, the wiper assembly being equipped with a blade according to the present invention;

Figure 2 is an elevational view of the mechanism as seen from the right of Figure 1;

Figure 3 is an enlarged transverse sectional view substantially on line 3—3 of Figure 1;

Figure 4 is an enlarged longitudinal sectional view substantially on line 4—4 of Figure 2;

Figure 5 is a still further enlarged longitudinal sectional view on line 5—5 of Figure 4, in which portions have been sectioned away; and Figure 6 is a fragmentary view on an enlarged scale of the blade as seen from the line 6—6 of Figure 4, showing in elevation the underside of the blade.

Referring to the drawings in detail, designated generally at 10 is an automobile including a cowl or hood 12 and windshield 14.

A windshield wiper blade support arm assembly generally designated 16 can be any of various types and does not per se constitute part of the present invention. Rather, the invention is so designed that the blades can be attached to support structures that might differ from one another in respect to their particular design, a characteristic of the invention being its adaptability for attachment to said structures with minimum modification and redesign of windshield wiper support arm mechanisms already designed and in use.

In the illustrated example, the support mechanism 16 includes a base 18 on which is mounted an oscillating shaft 20 carrying the radial extension 22. An elongated, channel-shaped arm 24, has a bifurcated inner end 26 embracing radial portion 22 and pivotally connected thereto by a hinge pin 28. Extending out of the channelled arm 24 is an elongated spring arm 30 on the outer end of which is provided a connector yoke 32 embracing and pivotally connected to a blade support bow 34.

Referring to Figures 1–3 at its opposite ends, bow 34 is integral with downwardly divergent clamp arms 36 having at their free ends confronting hook-spaced clamping fingers 38 in embracing relation to the opposite longitudinal edges of the blade 39 constituting the present invention.

Blade 39 includes an elongated, generally flat, wide backing plate 40 which is resiliently flexible to at least a slight degree in a longitudinal direction so to be conformed to the curvature of the windshield, under the pressure exerted against the ends of the backing plate by the ends of the spring bow.

The backing plate 40 at its inner and outer ends is formed with longitudinally and centrally projecting extensions 42, 44 of reduced width. The purpose of these will be presently made apparent. Plate 40 has, further, a wide, longitudinally and centrally extending slot 46 having closed ends disposed inwardly a short distance from the respective extensions 42, 44.

At selected intervals along the length of slot 46, plate 40 has at opposite sides of the slot transversely aligned recesses 48 opening into the slot. Bridging recesses 48 and fixedly connected between the end walls of the aligned recesses are arcuately bowed bridging elements 50 (see Figure 3). A substantial number of these is provided as will be noted in Figure 1, the bridging elements being in sets of three, there being a plurality of the sets spaced longitudinally of the slot as will be clearly apparent from Figure 1 and also from Figure 4.

The body 52 of the blade is formed of a soft rubber material, and has a cross-sectional shape best shown in Figure 3. The outer or back surface of body 52 is transversely convex, correspondingly to the curvature of the bridging element 50, with said bridging element being in firm engagement with the transversely curved back surface.

Formed in opposite sides of body 52 are outwardly opening, longitudinal slots 54, disposed in a common plane, with plate 40 also being in said plane. The provision of the slots or grooves 54 reduces the width of the body at the location of the grooves 54, providing overhangs that will overlie the side edge portions of the slot 46. The slot 46 of the plate 40 receives the reduced width portion of the body, so that the plate is detachably but swiftly and securely engaged with the body. This stiffens the body, though the body is still left, of course, free to flex longitudinally to conform to the shape of the windshield. It may be noted that the clamping fingers 38 are free to slide along the plate 40, and further, the plate 40 has limited sliding movement in respect to the body 52 of the blade. The relative sliding movement of the several components is designed to facilitate their curving longitudinally if necessary even in an arrangement such that each may curve to a slightly different degree than the adjacent component. Again, this is of importance to insure free and full flexibility of the device and complete conformity thereof to the shape of the windshield, else the windshield wiper blade will not clean properly.

Integrally formed upon the ends of the body are upwardly projecting abutments 56, 58 in which are engaged the tongues 42, 44 respectively. The abutments are high enough that they would engage the ends of the bow in the event the windshield wiper blade should tend to be displaced longitudinally of the bow to an excessive degree.

It is of importance to note that the blade constituting the present invention includes transversely spaced parallel blade elements 60, 60 (see Figure 3) each of which is progressively reduced in cross-sectional area in a direction from its integral connection to body 52 to its free, windshield wiper contacting edge. The flexibility of the blade elements is thus progressively increased in direct correspondence to its progressive reduction in cross-sectional area. This assures effective cleaning of the windshield, since each blade element follows the other in close proximity to the same. Therefore, should one blade element tend to pass over a particular area without fully wiping the same, the other blade element will wipe the area missed.

The blade elements define opposite walls of a heating channel which opens directly toward the windshield 14 and which extends the full length of body 52. In this connection, in the space between the blade elements, there is a row of closely spaced openings 62 communicating between the heating channel and an axial bore 64 of body 52. The perforations or openings 62 are closely spaced, uniformly over the full length of the blade, as will be seen from Figure 4. Accordingly, on energizing of a coiled resistance element 66 that extends within bore 64, all heat emanating from the resistance element 66 will be directed through the perforations into the heating channel and will be confined within said channel by the blade elements, so as to impinge directly against the windshield for the purpose of heating the same and melting ice and snow therefrom.

The bore 64 is closed at its opposite ends, so that heat cannot escape therethrough, but, of course, there is a small amount of heat which will warm the body 52, thus maintaining full flexibility thereof, and tending to melt any snow or ice which may impinge against the outer surface of the body, that is, areas of the body exteriorly of the heating channel defined between the blade elements 60.

To supply electrical current to the resistance element, there is provided a lead or conductor 68 which at one end is connected to one end of the resistance 66 at the location of the abutment 56. Lead 68 intermediate its ends is connected to the spring arm 30 by a suitable clip 70. The lead 68 is then protectively enclosed within the channel of arm 24, and at its other end has a plug 71 removably engageable in a suitable receptacle 72 provided at the base of the windshield. Receptacle 72 is electrically connected to a conductor 75 that extends from a suitable source of electric power, such as the positive post of the vehicle battery.

At its other end, resistance 66 is connected to a short lead 73 that is attached to an electrically conductive clip 74 which is in turn engaged with the tongue 44, which provides a ground connection.

Of course, electrical current would be controlled through the provision of a suitable switch located on the instrument panel so that the vehicle operator can heat the windshield wiper blades only when and as he finds it necessary. Further, the blades are readily removed from the windshield wiper mechanisms, so that if desired they could be used only in the winter months to prevent undue wear thereon.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a windshield wiper blade, an elongated body of a soft, resilient material having an axial bore therethrough; a pair of transversely spaced blade elements integral with said body and projecting therefrom to define therebetween a heating channel, the body having a row of openings communicating between said channel and said bore, the material of said body completely surrounding said bore except for the provision of the openings, said material being of substantial thickness over the full circumference of the bore; and an electrical resistance element extending within the bore, said material of the body protectively enclosing the element over the full circumference of said element, said element comprising the only component of the wiper blade disposed in said bore, whereby on energizing of said element, heat emanating therefrom will pass from the openings into the heating channel, said heating channel being closed at its sides by the blade elements over the full length of the body, for confining of the heat within the heating channel, whereby said heat will be caused to be concentrated against the windshield in the area between the blade elements.

2. In a windshield wiper blade, an elongated body of a soft resilient material having an axial bore therethrough; a pair of transversely spaced blade elements intgeral with said body and projecting therefrom to define therebetween a heating channel, the body having a row of openings communicating between said channel and said bore, the material of said body completely surrounding said bore except for the provision of the openings, said material being of substantial thickness over the full circumference of the bore; an electrical resistance element extending within the bore, said material of the body protectively enclosing the element over the full circumference of said element, said element comprising the only component of the wiper blade disposed in said bore, whereby on energizing of said element, heat emanating therefrom will pass from the openings into the heating channel; and a stiffener plate connected to said body and extending substantially the full length thereof, said stiffener plate being of a resilient material and being adapted to flex slightly in a longitudinal direction, the stiffener plate being tensioned to normally spring to a wholly planiform condition.

References Cited in the file of this patent

UNITED STATES PATENTS

| | | |
|---|---|---|
| 2,656,448 | Lentz | Oct. 20, 1953 |
| 2,686,247 | Curless | Aug. 10, 1954 |
| 2,746,077 | Higgins | May 22, 1956 |

FOREIGN PATENTS

| | | |
|---|---|---|
| 413,551 | Great Britain | July 19, 1934 |